(12) United States Patent
Naam

(10) Patent No.: US 7,562,068 B2
(45) Date of Patent: Jul. 14, 2009

(54) SYSTEM AND METHOD FOR RANKING SEARCH RESULTS BASED ON TRACKED USER PREFERENCES

(75) Inventor: Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 10/879,046

(22) Filed: Jun. 30, 2004

(65) Prior Publication Data

US 2006/0004711 A1    Jan. 5, 2006

(51) Int. Cl.
*G06F 17/30* (2006.01)
(52) U.S. Cl. .................................. 707/3; 707/5; 707/6
(58) Field of Classification Search ........................ None
See application file for complete search history.

(56) References Cited

U.S. PATENT DOCUMENTS

| | | | |
|---|---|---|---|
| 6,185,558 | B1 | 2/2001 | Bowman et al. |
| 6,564,210 | B1 | 5/2003 | Korda et al. |
| 2002/0103798 | A1 | 8/2002 | Abrol et al. |
| 2005/0071328 | A1* | 3/2005 | Lawrence ....................... 707/3 |
| 2005/0256848 | A1* | 11/2005 | Alpert et al. .................... 707/3 |
| 2006/0004711 | A1* | 1/2006 | Naam ............................. 707/3 |
| 2007/0038624 | A1* | 2/2007 | Choi et al. ..................... 707/5 |

FOREIGN PATENT DOCUMENTS

| | | |
|---|---|---|
| EP | 1050830 | 4/2001 |
| WO | 200142880 | 6/2001 |

OTHER PUBLICATIONS

European Search Report, Oct. 26, 2006.

\* cited by examiner

*Primary Examiner*—Charles Rones
*Assistant Examiner*—Belix M Ortiz
(74) *Attorney, Agent, or Firm*—Shook, Hardy & Bacon LLP

(57) ABSTRACT

A method and system are provided for ranking search results based on user preferences. The method includes monitoring user selections in response to user receipt of search results and tracking metadata related to user selections for user selections that exhibit a threshold satisfaction level. The method additionally includes storing the tracked metadata as user preferences and adjusting a ranking mechanism to increase the weight of user preferences in order to increase a ranking for search results that exhibit user preferences. The method additionally includes storing the user selections and the keyword search upon determining that the user selections exceed a threshold satisfaction level. The method may utilize the stored user selections and keyword search upon receiving a repeat search to alter presentation of new search results to the user.

18 Claims, 7 Drawing Sheets

SYSTEM AND METHOD FOR RANKING SEARCH RESULTS BASED ON TRACKED USER PREFERENCES

CROSS-REFERENCE TO RELATED APPLICATIONS

None

STATEMENT REGARDING FEDERALLY SPONSORED RESEARCH OR DEVELOPMENT

None.

TECHNICAL FIELD

Embodiments of the present invention relate to a system and method for ranking search results. More particularly, embodiments of the invention relate to a technique for ranking search results based on user preferences.

BACKGROUND OF THE INVENTION

Computer searching, particularly over the Internet, is a widespread technique for seeking information. Search engines typically produce results based on terms input by a user. The search engines typically order or rank the results based on the similarity of the terms found to the terms input by the user. Results that show identical words and word order with the request input by the user will typically be given a high rank and will be placed near the top of the list presented to the user.

A problem with most currently known techniques is the failure to account for user preferences. Given a particular request, each user entering that request will receive identical results.

Thus, web services are increasingly moving towards tailoring the information they provide to individual users. While some known systems are able to account for user preferences, the user is required to personally and proactively enter the preferences. Currently known systems are not capable of automatically ranking search results according to user preferences without explicit user customization.

For an Internet search engine to provide optimal results, it should take into account information about the past behavior of the customer issuing the query. Accordingly, a solution is needed that provides a way to effectively track relevant information about user behavior and use the tracked information to provide the most relevant results for the particular user. Personalizing the data presented by a web search engine in an effective manner could dramatically improve the user search experience, thus boosting customer loyalty and revenue.

BRIEF SUMMARY OF THE INVENTION

Embodiments of the present invention are directed to a method for ranking search results based on user preferences. The method includes monitoring user selections in response to user receipt of search results and tracking metadata related to user selections for user selections that exhibit a threshold satisfaction level. The method additionally includes storing the tracked metadata as user preferences and adjusting a ranking mechanism to increase the weighting of user preferences in order to increase a ranking for search results that exhibit user preferences.

In an additional aspect of the invention, a method is provided for altering a display of search results based on user behavior. The search results are obtained from a core search engine executing a user keyword search. The method includes monitoring user selections in response to user receipt of search results and storing the user selections and the keyword search upon determining that the user selections exceed a threshold satisfaction level. The method additionally includes utilizing the stored user selections and keyword search upon receiving a repeat search to alter presentation of new search results to the user.

In yet an additional aspect of the invention, a system is provided for ranking search results based on user preferences. The system includes a search satisfaction tracker for monitoring user selections and tracking user satisfaction and a personalization ranker for ranking search results for the user based on the tracked user satisfaction.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
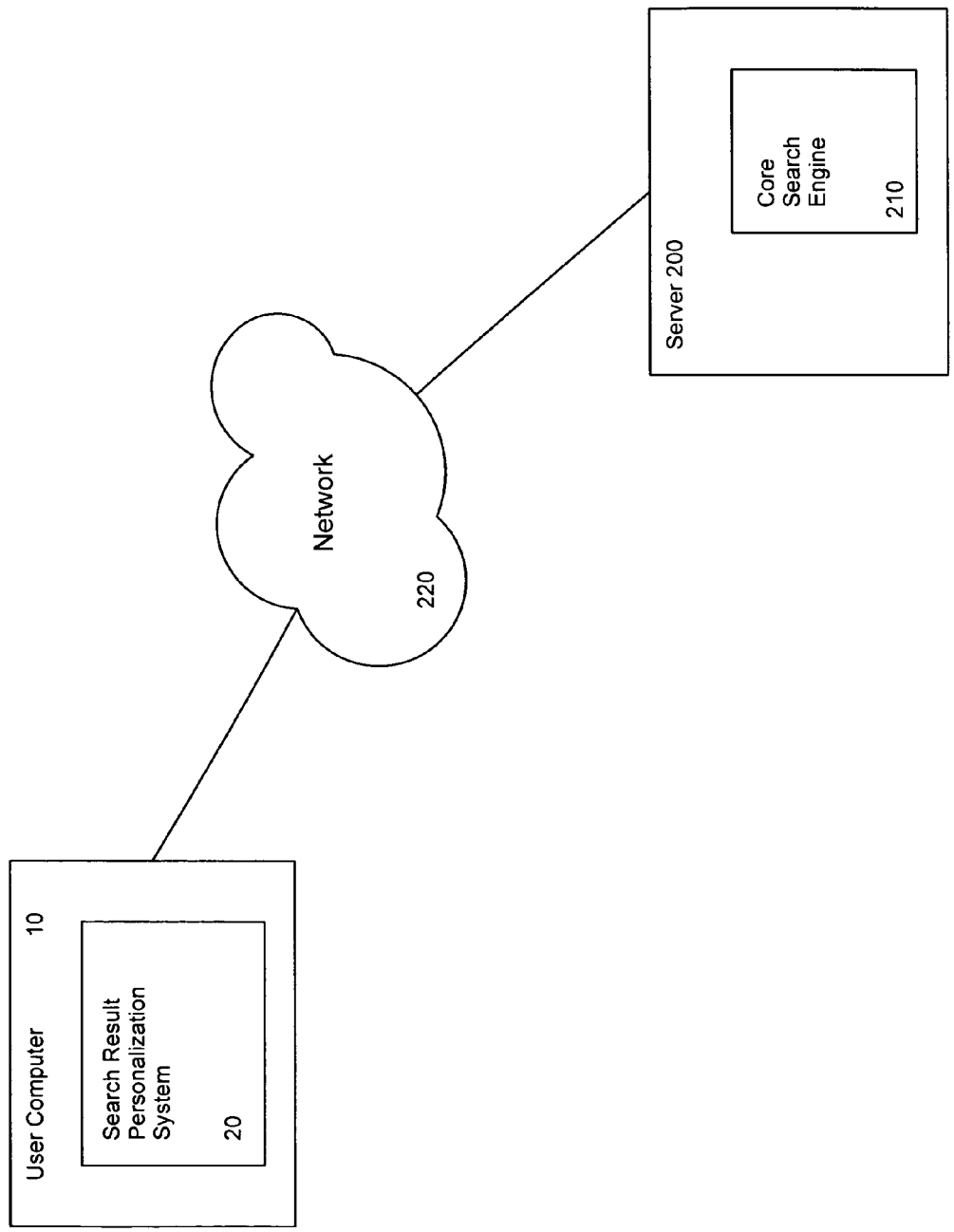
FIG. 1 is a block diagram illustrating an overview of a system in accordance with an embodiment of the invention.

Embodiments of the invention include a method and system for personalizing the ranking of search results. FIG. 1 is a block diagram illustrating an overview of such a system in accordance with an embodiment of the invention. FIG. 1 illustrates a user computer 10 including a search result personalization system 20. The user computer 10 is connected over a network 220, such as the Internet, with a server 200. The server 200 may be a web server that implements a core search engine 210.

In response to a user search request, the core search engine 210 performs a search based on input terms. The search result personalization system 20 receives the results located by the search engine 210 and ranks the results in accordance with perceived user preferences that it tracks by monitoring user actions. Although FIG. 1 illustrates the search result personalization system 20 on the client side, the search result personalization system 20 may also be implemented on the server side. In the displayed client-side implementation, the search result personalization system may track user actions without notifying the server side. As an additional alternative, in the client-side implementation, the search result personalization system 20 may automatically attach user preferences to each user query. In a server side model, the server may identify the user by a unique user identifier (UID) and search for user preferences stored in connection with the identifier.

The components of the search result personalization system 20 are further described below in conjunction with FIGS. 3-7.

II. Exemplary Operating Environment

Figure 2:
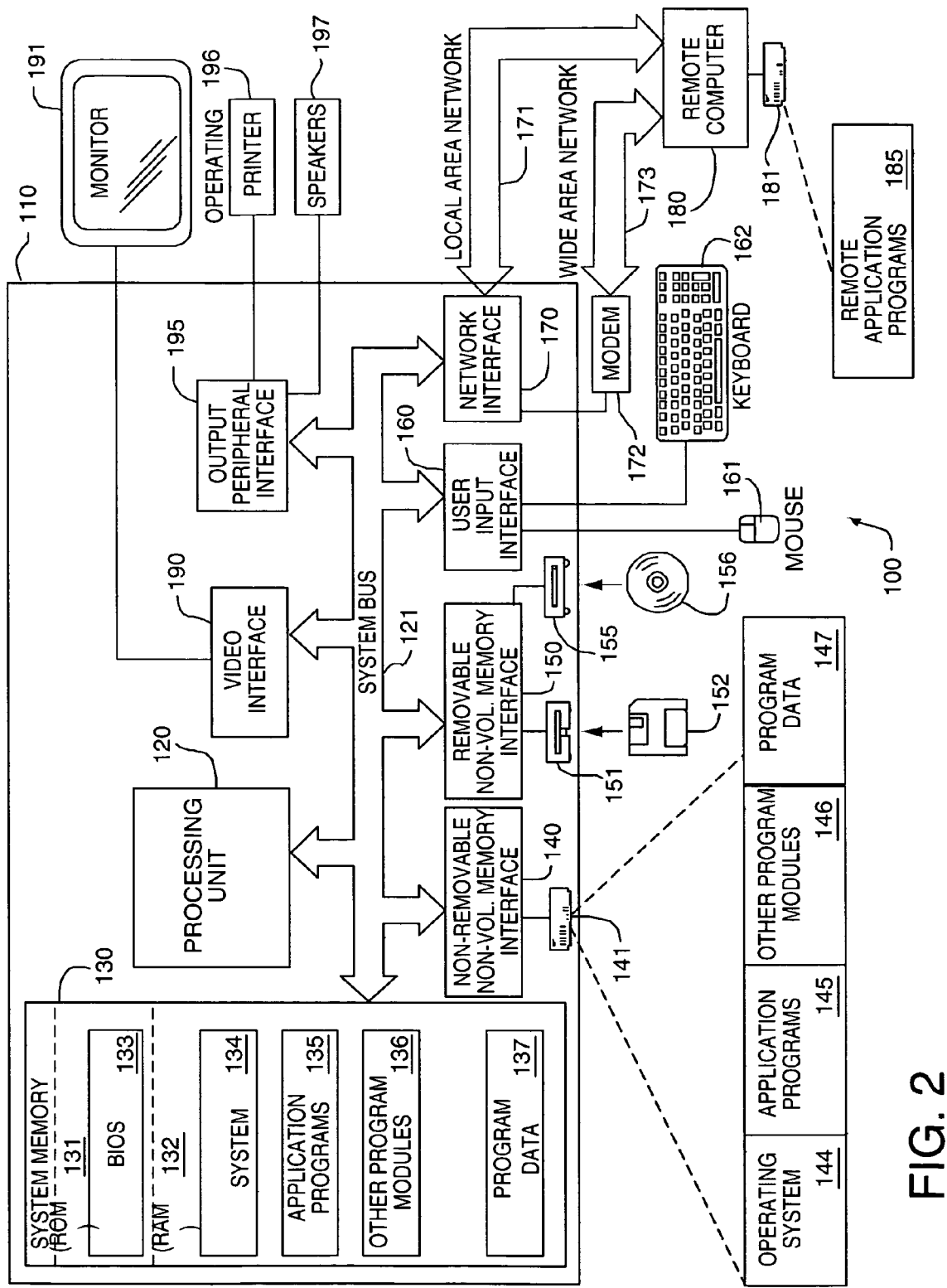
FIG. 2 is a block diagram illustrating a computerized environment in which embodiments of the invention may be implemented.

FIG. 2 illustrates an example of a suitable computing system environment 100 in which the search result personalization system 20 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

Figure 3:
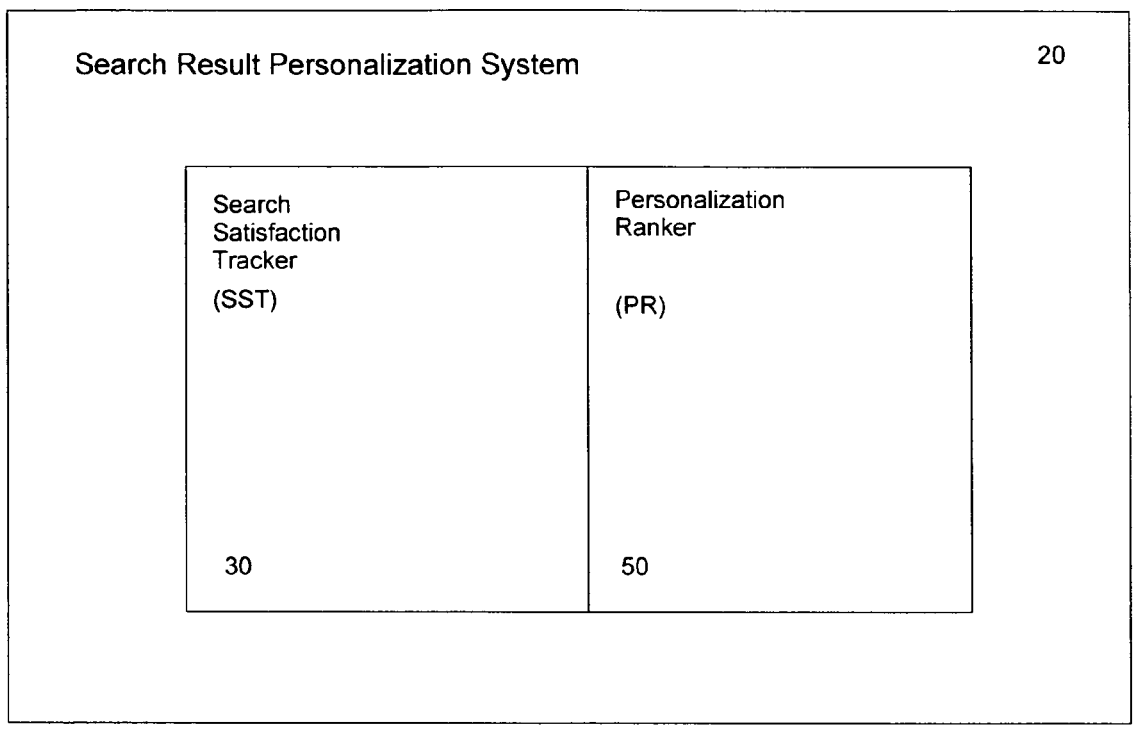
FIG. 3 is a block diagram illustrating a search result personalization system in accordance with an embodiment of the invention.

FIG. 3 illustrates components of the search result personalization system 20. The search result personalization system 20 may include a search satisfaction tracker (SST) 30 and a personalization ranker (PR) 50. These two components interact with the user and the core search engine 210 to rank search results according to user preferences.

Figure 4:
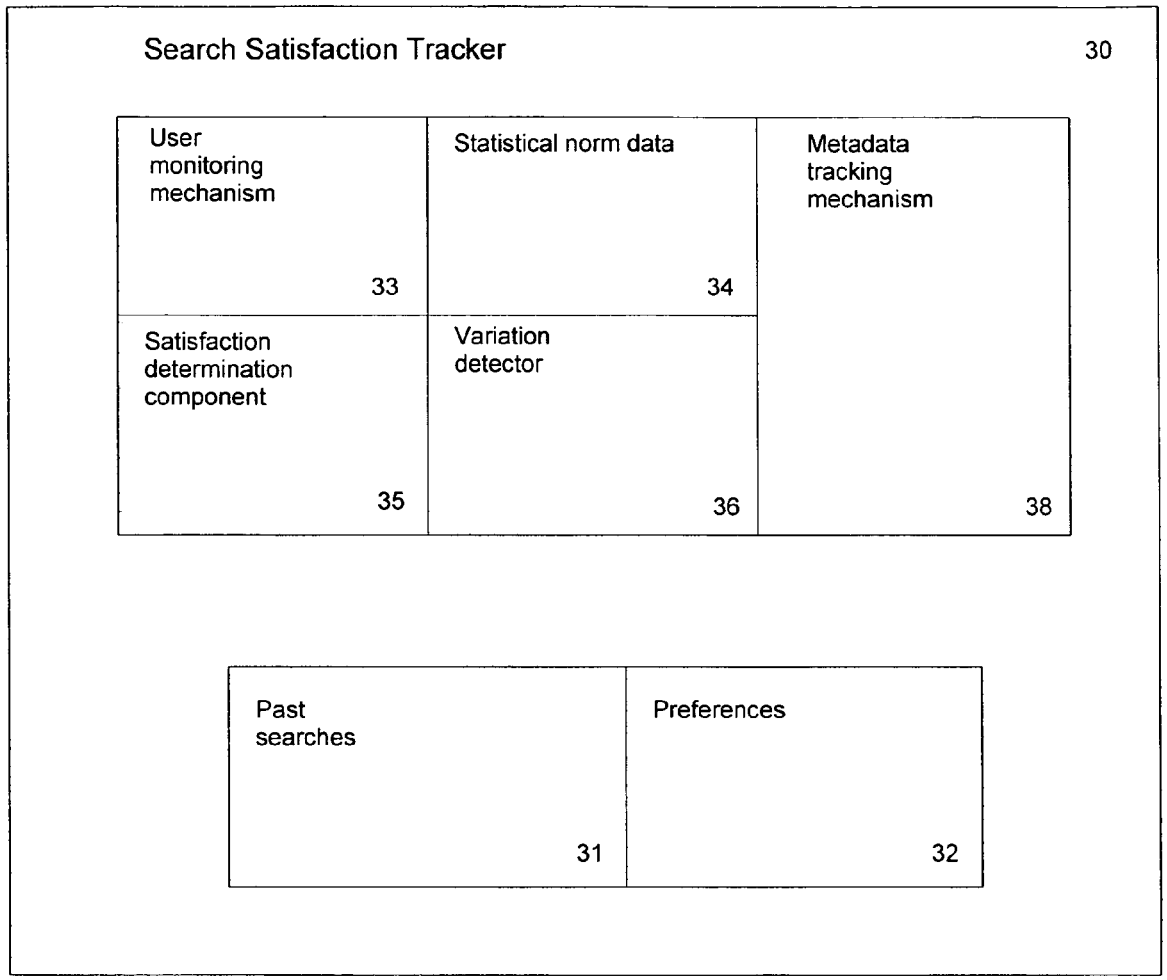
FIG. 4 is a block diagram illustrating a search satisfaction tracker in accordance with an embodiment of the invention.

FIG. 4 illustrates components of the SST 30 in accordance with an embodiment of the invention. The SST 30 maintains records of results that demonstrate high user satisfaction on a query-by-query basis. The SST 30 may store past searches 31 of the user and preferences 32. The past searches and user preferences may be stored in any of the storage structures described above with reference to the computerized environment. The storage of past searches may include storing the input terms and user selections previously received in conjunction with those terms. The preferences 32 may relate to an analysis of user choices. For example, the preferences 32 may reflect a user predisposition towards selections of documents based on characteristics such as page language, length, locale, document format, categories that it belongs to, and other attributes.

The SST 30 may additionally include a user monitoring mechanism 33, statistical norm data 34, a satisfaction determination component 35, a variation detector 36, and a metadata tracking mechanism 38. The user monitoring mechanism 33 provides other SST components with information regarding user selections. The user monitoring mechanism 33 monitors user actions with respect to search results provided by the core search engine 210.

The satisfaction determination component 35 determines whether a user's monitored actions indicate satisfaction. This invention is predicated on the ability to deduce user satisfaction from user behavior. This may be accomplished using any number of techniques that are outside the scope of this invention. The techniques may include monitoring a number of times or length of time that a user spends viewing a specific result.

The variation detector 36 utilizes the statistical norm data 34 to determine how far satisfaction indicators deviate from statistical norms stored within the statistical norm data 34. User satisfaction with search results is somewhat correlated with position in the result set. For efficiency's sake, the SST 30 only tracks satisfaction scores that deviate widely from the statistical norm of user satisfaction based on query result position. This threshold of deviation is tunable.

The metadata tracking mechanism 38 interacts with the user monitoring mechanism 33 to track characteristics of the selections that a user finds satisfactory. The tracked metadata may include features of resultant documents that the user appears to be highly satisfied with based on the determination of the variation detector 36. The metadata may include information such as page language, length, locale, document format, categories that it belongs to, and other attributes. The metadata tracking mechanism may also track specific domains such as .edu, .gov, or org. The metadata tracking mechanism 38 identifies statistically abnormal and significant correlations between page attributes and user satisfaction. For example, if a user tends to have high satisfaction with PDF documents much more frequently than the average user, the SST 30 will track this. This information will ultimately be utilized by the personalization ranker 50 to increase the importance of these criteria when ranking results.

Figure 5:
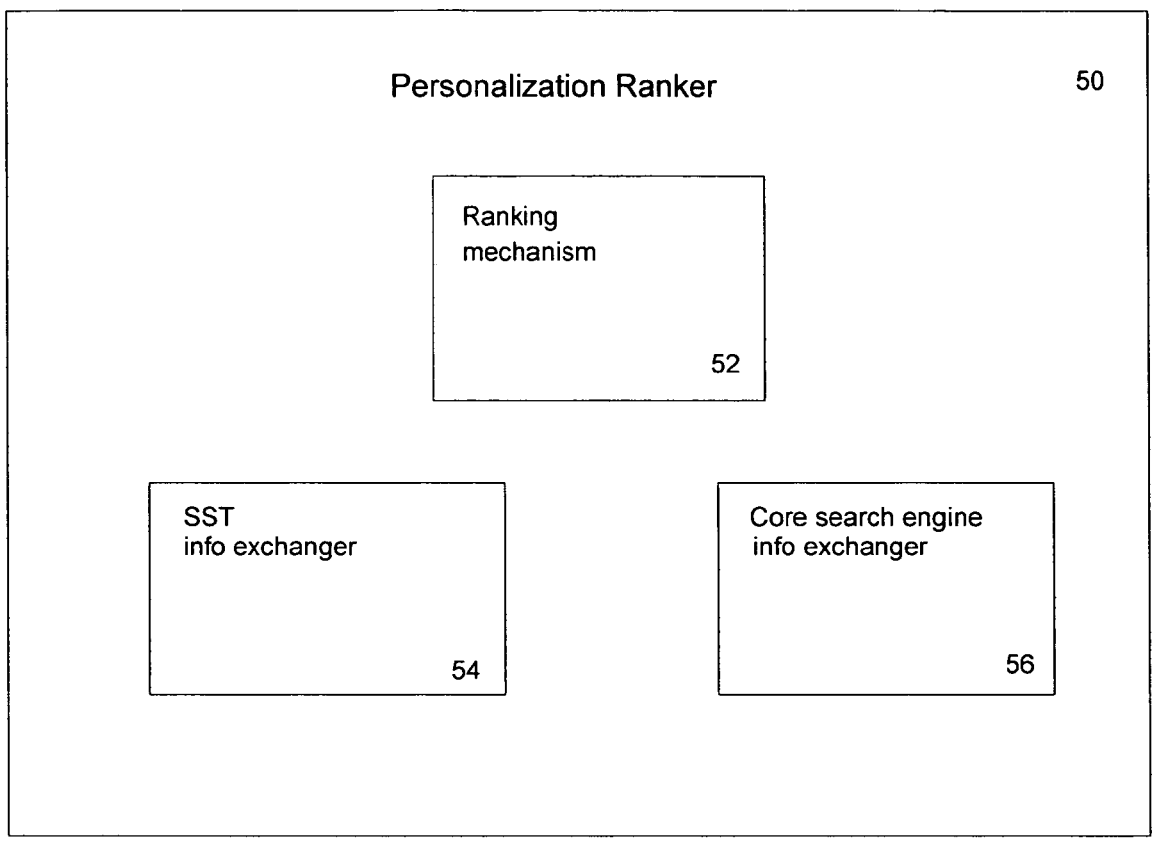
FIG. 5 is a block diagram illustrating a personalization ranker in accordance with an embodiment of the invention.

FIG. 5 illustrates a personalization ranker (PR) 50 in accordance with an embodiment of the invention. The PR 50 uses data from the SST 30 to adjust the ranking of results for a given query. The PR 50 may run on the Internet search server 200 or on the user computer 10. The PR 50 uses the data from the SST 30 to adjust the ranking of results for a given query. The personalization ranker 50 may include a ranking mechanism 52, a SST information exchanger 54 and a core search engine information exchanger 56. Based on information provided by the SST 30 through the SST information exchanger 54, the ranking mechanism 52 determines whether any results provided by the core search engine 210 should be "promoted" or advanced in ranking, such that the results would appear closer to the top of the search results list ultimately provided to the user.

The PR 50 generally provides two types of rank adjustments. First, if the search is a repeat search, the SST 30 may have specific information related to user satisfaction. In this case, the ranking mechanism 52 will promote past satisfied results. The ranking mechanism 52 will increase the rank of results that the customer was satisfied with during previous issues of the same query. As set forth above, the SST 30 maintains relevant records in past searches 31.

Secondly, if the search is not a repeat search, the SST 30 may still have information stored about user preferences stored in the preferences 32 as tracked by the metadata tracking mechanism 38. In response to the receipt of this information, the ranking mechanism 52 may adjust its ranking algorithm weights based on user satisfaction. The ranking mechanism 52 passes its recommendation or weighting adjustment to the search engine 210. Based on the recommendation of the PR 50, the search engine 210 may increase the weight assigned to page attributes that are disproportionately represented in query results the user is satisfied with.

As an example of the first of the above-described ranking situations, a user may input a repeat query for "fast cars". The first time the search terms were entered, the user may have clicked on the third link for "Fast Cars Magazine". The SST stores this preference and passes it to the PR 50. The PR 50 may recommend adjustment of the rankings to recommend that "Fast Cars Magazine" be listed as the first result. Alternatively, the PR 50 may recommend that the core search engine 210 display the link for "Fast Cars Magazine" and any other previously selected links in an entirely separate section of the display.

In the second scenario, the search may be a new non-repeat search. If the user preferences section 32 indicates that the user typically selects documents from ".edu" sites, the SST 30 will pass this information to the PR 50. The PR 50 will increase the weights of the educational results in order to increase their rankings.

Figure 6:
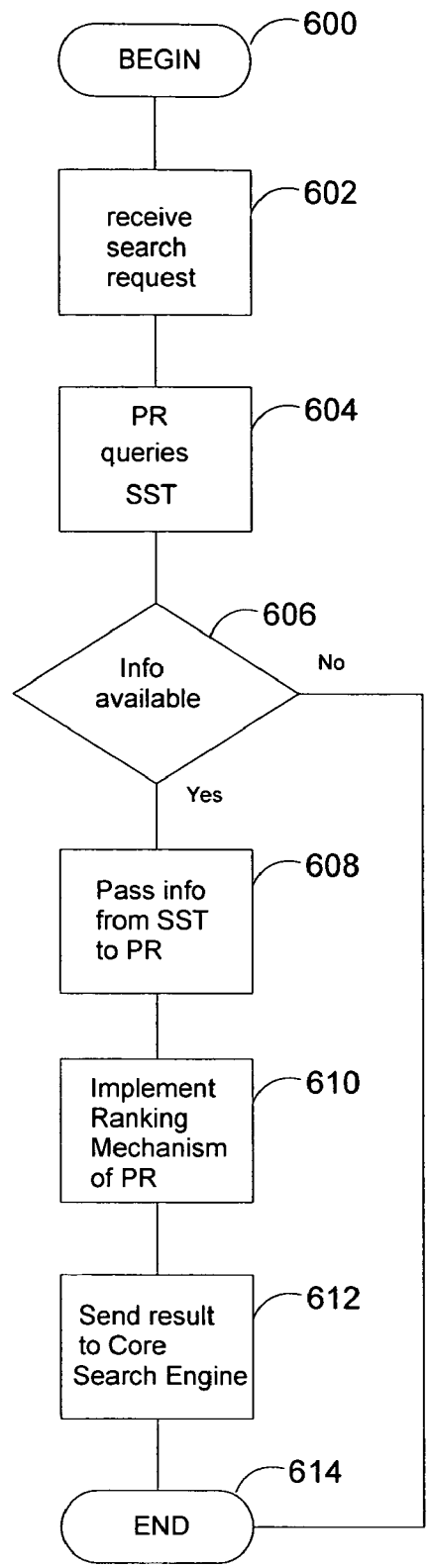
FIG. 6 is a flow chart illustrating a method for processing a search request using the personalized ranking device.

FIG. 6 is a flow chart illustrating a process flow for operation of the PR 50 during processing of a search request. In step 602, the search request is received and the core search engine 210 produces results. In step 604, the PR 50 queries the SST 30 to determine whether any of the results provided by the core search engine 210 should be promoted. In step 606, the PR 50 receives an indication from the SST 30 as to whether any information is available. If information is available, the SST 30 passes the information to the PR 50 in step 608. In step 610, the PR 50 implements the ranking mechanism 52 to promote results recommended by the SST 30. The ranking mechanism 52 may adjust its ranking algorithm weights based on user satisfaction. For example, when the SST 30 has identified a set of page attributes (such as categories, document type, document length, or other metadata) that, for this user correlate with satisfaction in a way that is substantially and statistically significantly beyond their correlation with user satisfaction for the population as a whole, it will report these correlations and the strength of their deviation from the norm to the PR 50. The ranking mechanism 52 adjusts its algorithm accordingly. In step 612, the PR 50 sends its results to the core search engine 210. From that point on, until the SST 30 reports a change in correlation or the user instructs otherwise, the PR 50 will instruct the core internet search engine 210 to more heavily weigh these page attributes in ranking.

Figure 7:
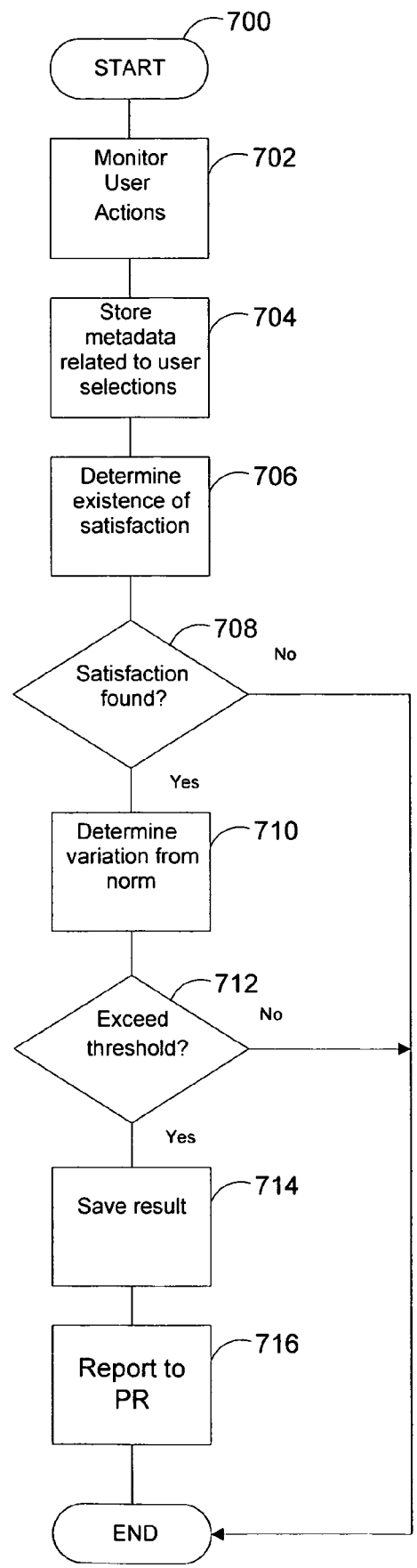
FIG. 7 is a flow chart illustrating technique for implementing the search satisfaction tracker in accordance with an embodiment of the invention.

FIG. 7 is a flow chart illustrating a process flow for the SST 30. Assuming a user has submitted a search request and has received a result set, the process begins in step 700. In step 702, the SST 30 monitors user actions with respect to the provided result set. In step 704, the SST 30 stores metadata related to user selections. These selections reveal user preferences and are stored in the user preference section 32 of the SST 30 for future use.

In step 706, the SST 30 determines the existence of user satisfaction. Satisfaction is found based on any number of factors, which are outside the scope of the present invention, but may include such factors as the number of results a user selects or the length of time a user spends reviewing a result. If no satisfaction is found, the process ends. If satisfaction is found by the SST 30 in step 708, the SST 30 determines a variation from statistical norms in step 710. For example, the SST 30 will determine if this particular user's satisfaction level is significantly greater than that of the average user. An arbitrary threshold may be set.

In step 712, if the satisfaction level does not exceed the preset threshold, the process ends. If the satisfaction level does exceed the preset threshold, the SST 30 saves the result in step 714 by saving the entire search in past searches and the user preferences in the preferences section 32. In step 716, the SST 30 reports satisfaction tracking results to the PR 50.

For an Internet search engine to provide best results, it must take into account information about the past behavior of the customer issuing the query. This invention provides a technique for effectively tracking relevant information about user behavior and for using the information to provide the most relevant results. The invention is predicated on the ability to deduce user satisfaction from user behavior. Once given this data, the search engine will improve the ranking of user results by promoting past satisfactory results during searches, adjusting the ranking algorithm weights based on user satisfaction, and promoting pages that users with similar tastes are satisfied with.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. One or more computer-storage media storing computer-useable instructions that, when used by a computing device, cause the computing device to perform a method for ranking search results based on individual user selections and user preferences for a user, the method comprising:

monitoring user selections of one or more search results from a first set of search results received in response to a first user search query;

identifying at least one search result from the one or more search results that meets a threshold satisfaction level based on satisfaction indicators associated with user selection of the at least one search result deviating from statistical satisfaction indicator norm data;

storing the at least one search result in association with the first user search query within the user preferences for the user;

tracking metadata associated with the at least one search result, wherein at least some of the tracked metadata comprises page attribute data, the page attribute data comprising at least one selected from the following: website root domain, page language, document type, and document length;

storing the tracked metadata within the user preferences for the user;

receiving a second user search query, the second user search query matching the first user search query;

providing a second set of search results in response to the second user search query, wherein ranking of the at least one search result is increased in the second set of search results based on the second user search query matching the first user search query and the at least one search result being stored in association with the first user search query within the user preferences for the user;

receiving a third user search query, the third user search query not matching the first user search query; and providing a third set of search results in response to the third user search query by adjusting a ranking mechanism used to rank one or more search results within the third set of search results by increasing a weighting assigned to page attributes associated with the one or more search results within the third set of search results corresponding with the tracked metadata stored within the user preferences for the user.

2. The computer-storage media of claim 1, wherein storing the tracked metadata comprises storing data describing file attributes of user selections.

3. The computer-storage media of claim 1, further comprising altering a user display to provide past search data separately from current search results.

4. The computer-storage media of claim 1, further comprising communicating the increased ranking to a core search engine.

5. The computer-storage media of claim 1, wherein a satisfaction indicator comprises at least one factor of the number of times a user selects a website link or the length of time a user spends viewing a website.

6. A computerized system for ranking search results based on individual user preferences, the computerized system including a processor and one or more computer-storage media comprising:

a search satisfaction tracker for monitoring user selections of one or more search results from a first set of search results received in response to a first user search query and tracking user satisfaction of at least one search result from the one or more search results where the at least one search result meets a threshold satisfaction level based on satisfaction indicators associated with the user selection of the at least one search result deviating from statistical satisfaction indicator norm data, wherein at least some metadata tracked comprises page attribute data, the page attribute data comprising at least one selected from the following: website root domain, page language, document type, and document length, and wherein the search satisfaction tracker stores the at least one search result in association with the first user search query within the user preferences for the user and, further, stores the tracked metadata within the user preferences for the user; and a personalization ranker for ranking search results for the user based on the tracked user satisfaction by increasing a weighting of one or more search results to increase a ranking for the search results that exhibit individual user preferences, wherein the weighting is based on a deviation of the individual user preferences from a statistical norm for a searching population, the strength of the deviation correlating to the strength of the weighting, the personalization tracker providing a second set of search results in response to a second user search query, wherein ranking of the at least one search result is increased in the second set of search results based on the second user search query matching the first user search query and the at least one search result being stored in association with the first user search query within the user preferences for the user, and the personalization tracker further providing a third set of search results in response to a third user search query by adjusting a ranking mechanism used to rank one or more search results within the third set of search results by increasing a weighting assigned to page attributes associated with the one or more search results within the third set of search results corresponding with the tracked metadata stored within the user preferences for the user.

7. The computerized system of claim 6, wherein the search satisfaction tracker comprises a past searches area for storing past searches and corresponding user selections exceeding a-preset preset satisfaction threshold.

8. The computerized system of claim 6, further comprising a variation detector for determining the deviation of the satisfaction level from the statistical norm.

9. The computerized system of claim 6, wherein the personalization ranker comprises a communication mechanism for receiving information from the search satisfaction tracker and a ranking mechanism for recommending result rankings based on the received information.

10. The computerized system of claim 6, wherein a satisfaction indicator comprises at least one factor of the number of times a user selects a website link or the length of time a user spends viewing a website.

11. The computerized system of claim 6, wherein the personalization ranker communicates the increased ranking to a core search engine.

12. The computerized system of claim 6, wherein the personalization ranker alters a user display to provide past search data separately from current search results.

13. A computing device having a processor and one or more computer- storage media storing computer-useable instructions that, when used by the computing device, cause the computing device to perform a method for ranking search results based on individual user selections and user preferences for a user, the method comprising:

monitoring user selections of one or more search results from a first set of search results received in response to a first user search query;

identifying at least one search result from the one or more search results that meets a threshold satisfaction level based on satisfaction indicators associated with user selection of the at least one search result deviating from statistical satisfaction indicator norm data;

storing the at least one search result in association with the first user search query within the user preferences for the user;

tracking metadata associated with the at least one search result, wherein at least some of the tracked metadata comprises page attribute data, the page attribute data comprising at least one selected from the following: website root domain, page language, document type, and document length;

storing the tracked metadata within the user preferences for the user;

receiving a second user search query, the second user search query matching the first user search query;

providing a second set of search results in response to the second user search query, wherein ranking of the at least one search result is increased in the second set of search results based on the second user search query matching the first user search query and the at least one search result being stored in association with the first user search query within the user preferences for the user;

receiving a third user search query, the third user search query not matching the first user search query; and providing a third set of search results in response to the third user search query by adjusting a ranking mechanism used to rank one or more search results within the third set of search results by increasing a weighting assigned to page attributes associated with the one or more search results within the third set of search results corresponding with the tracked metadata stored within the user preferences for the user.

14. The computing device of claim 13, wherein storing the tracked metadata comprises storing data describing file attributes of user selections.

15. The computerized system of claim 6, wherein the tracked metadata stored by the search satisfaction tracker comprises storing data describing file attributes of user selections.

16. The computing device of claim 13, further comprising altering the presentation of search results by changing an ordering of the presented results.

17. The computing device of claim 13, further comprising altering a user display to provide past search data separate from current search results.

18. The computing device of claim 13 wherein a satisfaction indicator comprises at least one factor of the number of times a user selects a website link or the length of time a user spends viewing a website.

* * * * *